(12) United States Patent
Li

(10) Patent No.: US 10,163,463 B2
(45) Date of Patent: Dec. 25, 2018

(54) VIRTUAL REALITY SYSTEM AND METHOD OF CONTROLLING WORKING STATE THEREOF

(71) Applicant: Beijing Pico Technology Co., Ltd., Beijing (CN)

(72) Inventor: Wei Li, Beijing (CN)

(73) Assignee: BEIJING PICO TECHNOLOGY CO., LTD., Beijing (CN)

( * ) Notice: Subject to any disclaimer, the term of this patent is extended or adjusted under 35 U.S.C. 154(b) by 1 day.

(21) Appl. No.: 15/363,536

(22) Filed: Nov. 29, 2016

(65) Prior Publication Data
US 2017/0345457 A1   Nov. 30, 2017

(30) Foreign Application Priority Data
May 27, 2016   (CN) .......................... 2016 1 0366230

(51) Int. Cl.
*G11B 27/00*  (2006.01)
*G06T 19/00*  (2011.01)
*G11B 27/34*  (2006.01)
*H04N 5/272*  (2006.01)
*H04N 5/93*   (2006.01)

(52) U.S. Cl.
CPC .......... *G11B 27/005* (2013.01); *G06T 19/006* (2013.01); *G11B 27/34* (2013.01); *H04N 5/272* (2013.01); *H04N 5/9305* (2013.01)

(58) Field of Classification Search
CPC ..... G11B 27/005; G11B 27/34; G06T 19/006; H04N 5/272; H04N 5/9305
See application file for complete search history.

(56) References Cited

U.S. PATENT DOCUMENTS

| 2004/0212711 | A1* | 10/2004 | Stavely .............. H04N 5/23293 348/333.03 |
| 2015/0123966 | A1* | 5/2015 | Newman ................ G06T 19/006 345/419 |
| 2015/0382131 | A1 | 12/2015 | Kuehne et al. |
| 2016/0062454 | A1 | 3/2016 | Wang et al. |

(Continued)

FOREIGN PATENT DOCUMENTS

CN   204883047 U   12/2015

*Primary Examiner* — Mishawn N Hunter
(74) *Attorney, Agent, or Firm* — Arent Fox LLP

(57) ABSTRACT

A virtual reality system and a method of controlling working state of the virtual reality system. The virtual reality system comprises a video playing device and a virtual reality glasses box, and the virtual reality glasses box utilizes a screen of the video playing device to play a video content, the method comprises: establishing a wired or wireless connection between the video playing device and the virtual reality glasses box; when the video playing device is placed in the virtual reality glasses box, transmitting information of wearing state of the virtual reality glasses box to the video playing device; and controlling a playing state of the video playing device according to the wearing state of the virtual reality glasses box. The present disclosure controls the working state of the virtual reality device by the action of the user operating the device itself, and the user does not need to employ tedious and complicated operations to control each of the devices, which increases usability, and improves user experience.

6 Claims, 2 Drawing Sheets

(56) References Cited

U.S. PATENT DOCUMENTS

2016/0063767 A1    3/2016  Lee et al.
2016/0370970 A1*  12/2016  Chu .................... G06F 3/04815
2017/0115689 A1    4/2017  Liu
2017/0329488 A1*  11/2017  Welker ................ G06F 3/04815

* cited by examiner

VIRTUAL REALITY SYSTEM AND METHOD OF CONTROLLING WORKING STATE THEREOF

CROSS-REFERENCE TO RELATED APPLICATION

This application claims the benefit and priority of Chinese Patent Application No. 201610366230.9 filed May 27, 2016. The entire disclosure of the above application is incorporated herein by reference.

TECHNICAL FIELD

The present disclosure relates to the technical field of virtual reality, and particularly to a virtual reality system and a method of controlling working state of the virtual reality system.

BACKGROUND

In recent years virtual reality technology has had a great development. However, due to the limitation by hardware performance, a single device generally cannot satisfy the demand of users on experiencing virtual reality environment. Therefore, during the process of experiencing virtual reality environment one may need to employ in combination a plurality of devices, and thus the user is required to control the plurality of devices by tedious operations, which is inconvenience for use.

For example, regarding a virtual reality device of the structure of mobile telephone plus virtual reality glasses box, the mobile telephone has two working states that: when the user places the mobile telephone inside the virtual reality glasses box, he needs to firstly set the working mode of the mobile telephone to a virtual reality mode, and when the user, after finishing the virtual reality experiencing, takes the mobile telephone out of the virtual reality glasses box, he needs to switch the working mode of the mobile telephone back to a traditional mode, in order to normally use it afterwards. When the working mode of the mobile telephone is switched between the virtual reality mode and the traditional mode, the user needs to set a menu by frequent operations, which operations are tedious and complicated.

SUMMARY OF THE DISCLOSURE

In order to simplify user operation during experiencing virtual reality and provide better user experience, the present disclosure provides a virtual reality system and a method of controlling working state of the virtual reality system.

According to one aspect of the present disclosure, the present disclosure provides a method of controlling working state of a virtual reality system, wherein the virtual reality system comprises a video playing device and a virtual reality glasses box, and the virtual reality glasses box utilizes a screen of the video playing device to play a video content, the method comprising:

establishing a wired or wireless connection between the video playing device and the virtual reality glasses box;

when the video playing device is placed in the virtual reality glasses box, transmitting information of wearing state of the virtual reality glasses box to the video playing device; and controlling a playing state of the video playing device according to the wearing state of the virtual reality glasses box.

Preferably, the method further comprises: providing a first proximity sensor on the video playing device or utilizing a first proximity sensor already provided on the video playing device, to monitor a distance from the virtual reality glasses box;

if the first proximity sensor monitors that the distance from the virtual reality glasses box is less than a first preset distance, determining that the video playing device is placed in the virtual reality glasses box, and if at this time the video playing device is in a traditional mode, switching the video playing device from the traditional mode to a virtual reality mode, and starting up a picture for adjusting and affirming a position relative to the virtual reality glasses box; and if the first proximity sensor monitors that the distance from the virtual reality glasses box is greater than the first preset distance, determining that the video playing device is not placed in the virtual reality glasses box, and if at this time the video playing device is in the virtual reality mode, switching the video playing device from the virtual reality mode to the traditional mode.

Preferably, the method further comprises:

providing a second proximity sensor on the virtual reality glasses box or utilizing a second proximity sensor already provided on the virtual reality glasses box, to monitor a distance from eyes of a user; and if the user is normally wearing the virtual reality glasses box, the second proximity sensor can monitor that the distance from the eyes of the user is less than a second preset distance;

when the working state of the video playing device is the virtual reality mode, utilizing the second proximity sensor to monitor in real time the distance from the eyes of the user;

if the second proximity sensor monitors that the distance from the eyes of the user is less than the second preset distance, determining that the virtual reality glasses box is in a worn state; and if the second proximity sensor monitors that the distance from the eyes of the user is greater than the second preset distance, determining that the virtual reality glasses box is in a not-worn state.

Preferably, the controlling a playing state of the video playing device according to the wearing state of the virtual reality glasses box comprises:

when it is determined that the virtual reality glasses box is in the not-worn state, if the video playing device is playing a video content, pausing the playing of the video content, and shutting down the screen of the video playing device.

Preferably, the controlling a playing state of the video playing device according to the wearing state of the virtual reality glasses box further comprises:

when it is determined that the virtual reality glasses box is in the worn state, if the playing of a video content in the video playing device was paused because the virtual reality glasses box is in the not-worn state, starting up the screen of the video playing device, and continuing to play the video content from the pausing point.

According to another aspect of the present disclosure, the present disclosure provides a virtual reality system, wherein the virtual reality system comprises a video playing device and a virtual reality glasses box, and the virtual reality glasses box utilizes a screen of the video playing device to play a video content, wherein the virtual reality glasses box is provided with a communication module, the communication module configured to establish a wired or wireless connection with the video playing device, and when the video playing device is placed in the virtual reality glasses box, transmit information of wearing state of the virtual reality glasses box to the video playing device; and the video playing device comprises a playing controlling module, the playing controlling module configured to control a playing state of the video playing device according to the wearing state of the virtual reality glasses box.

Preferably, the video playing device is provided with a first proximity sensor, the first proximity sensor configured to in real time monitor a distance from the virtual reality glasses box; and the video playing device further comprises a working mode controlling module, the working mode controlling module configured to, if the first proximity sensor monitors that the distance from the virtual reality glasses box is less than a first preset distance, determine that the video playing device is placed in the virtual reality glasses box, and if at this time the video playing device is in a traditional mode, switch the video playing device from the traditional mode to a virtual reality mode, and start up a picture for adjusting and affirming a position relative to the virtual reality glasses box; and if the first proximity sensor monitors that the distance from the virtual reality glasses box is greater than the first preset distance, determine that the video playing device is not placed in the virtual reality glasses box, and if at this time the video playing device is in the virtual reality mode, switch the video playing device from the virtual reality mode to the traditional mode.

Preferably, the virtual reality glasses box is provided with a second proximity sensor, the second proximity sensor configured to monitor a distance from the eyes of the user; and the virtual reality glasses box further comprises a wearing state determining module, the wearing state determining module configured to, if the second proximity sensor monitors that the distance from the eyes of the user is less than a second preset distance, determine that the virtual reality glasses box is in a worn state; and if the second proximity sensor monitors that the distance from the eyes of the user is greater than the second preset distance, determine that the virtual reality glasses box is in a not-worn state.

Preferably, the playing controlling module is configured to, when the virtual reality glasses box is in the not-worn state, if the video playing device is playing a video content, pause the playing of the video content, and shut down the screen of the video playing device.

Preferably, the playing controlling module is further configured to, when the virtual reality glasses box is in the worn state, if the playing of a video content in the video playing device was paused because the virtual reality glasses box is in the not-worn state, start up the screen of the video playing device, and continue to play the video content from the pausing point.

The advantageous effects of the embodiments of the present disclosure are as follows: by establishing a wired or wireless connection between the video playing device and the virtual reality glasses box, when the video playing device is placed in the virtual reality glasses box, transmitting information of wearing state of the virtual reality glasses box to the video playing device, and controlling a playing state of the video playing device according to the wearing state of the virtual reality glasses box, the user does not need to employ tedious and complicated operations to control each of the devices, and the action of the user operating the device itself is enough to control the working state of the virtual reality device, which increases the usability. In a preferred embodiment, if during the process of the playing of the video content by the video playing device the user takes off the virtual reality glasses box, the video playing device pauses the playing, and shuts down the screen of the video playing device, and after the user wears the virtual reality glasses box again, starts up the screen of the video playing device, and continues to play from the pausing point, which enables the user to not miss any video content, and can also save the electric power of the device for playing the video.

DETAILED DESCRIPTION

The design idea of the present disclosure is as follows: regarding the virtual reality device of the structure of mobile telephone+virtual reality glasses box, by utilizing proximity sensors provided on each of the mobile telephone and the virtual reality glasses box to detect the action of the user, and associating them to perform interactive controlling, the user does not need to employ tedious and complicated operations to control each of the devices, and the action of the user operating the device itself is enough to control the working state of the virtual reality device, to thereby increase usability and improve user experience.

The embodiments of the present disclosure will be described below in further detail in conjunction with the figures to make the objectives, technical solutions and advantages of the present disclosure clearer.

Figure 1:
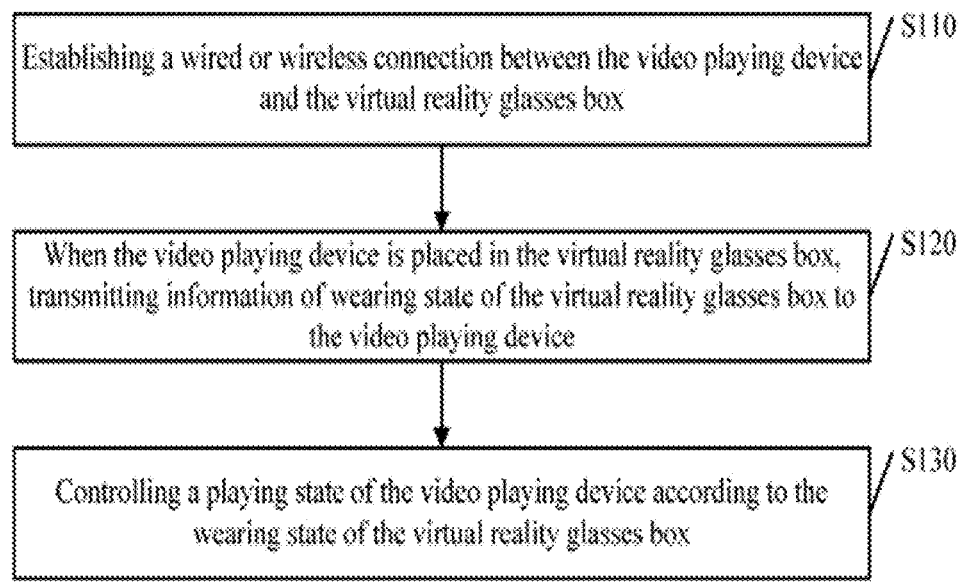
FIG. 1 is the flow chart of a method of controlling working state of a virtual reality system provided by an embodiment of the present disclosure.

FIG. 1 is the flow chart of a method of controlling working state of a virtual reality system provided by an embodiment of the present disclosure. As shown in FIG. 1, the method of controlling working state of a virtual reality system provided by the embodiment of the present disclosure comprises:

Step S110: establishing a wired or wireless connection between the video playing device and the virtual reality glasses box.

Step S120: when the video playing device is placed in the virtual reality glasses box, transmitting information of wearing state of the virtual reality glasses box to the video playing device.

In order to automatically identifying whether the working mode of the video playing device is a virtual reality mode or a traditional mode, the method of controlling working state of a virtual reality system provided by a preferred embodiment of the present disclosure further comprises: providing a first proximity sensor on the video playing device or utilizing a first proximity sensor already provided on the video playing device, to monitor the distance from the virtual reality glasses box; and setting a first preset distance, so that when the video playing device is placed in the virtual reality glasses box, the first proximity sensor can monitor that the distance from the virtual reality glasses box is less than the first preset distance.

If the first proximity sensor monitors that the distance from the virtual reality glasses box is less than the first preset distance, it can be determined that the video playing device has been placed in the virtual reality glasses box, and if at this time the working mode of the video playing device is the traditional mode, the video playing device switches the working mode of the video playing device from the traditional mode to the virtual reality mode, and starts up a picture for adjusting and affirming the position relative to the virtual reality glasses box; and if the first proximity sensor monitors that the distance from the virtual reality glasses box is greater than the first preset distance, it can be determined that the video playing device has not been placed in the virtual reality glasses box, and if at this time the working mode of the video playing device is the virtual reality mode, the video playing device switches the working mode of the video playing device from the virtual reality mode to the traditional mode. The user does not need to switch the virtual reality mode and the traditional mode of the video playing device by frequently operating a menu. He only needs to place the video playing device into the virtual reality glasses box, and then the video playing device will automatically switch to the virtual reality mode, to enable the user to start the experiencing of the virtual reality environment. When the user finishes the experiencing, he only needs to take the video playing device out of the virtual reality glasses box, and then the video playing device will automatically switch back to the traditional mode, to enable the user to use the video playing device in a normal way. The user does not need to employ tedious and complicated operations to complete the interaction with the device, and the action of operating the device itself is enough to indicate the intention of the user, which simplifies user operation and improves user experience.

Step S130: controlling a playing state of the video playing device according to the wearing state of the virtual reality glasses box.

The virtual reality glasses box has two states, wherein one is that the user is normally wearing the virtual reality glasses box, and the other is that the user is not wearing the virtual reality glasses box. In order to obtain information of the current wearing state of the virtual reality glasses box, the method of controlling working state of a virtual reality system provided by another preferred embodiment of the present disclosure further comprises: providing a second proximity sensor on the virtual reality glasses box or utilizing a second proximity sensor already provided on the virtual reality glasses box, to monitor in real time the distance from the eyes of the user; setting a second preset distance, so that if the user is normally wearing the virtual reality glasses box, the second proximity sensor can monitor that the distance from the eyes of the user is less than the second preset distance; if the second proximity sensor monitors that the distance from the eyes of the user is less than the second preset distance, determining that the virtual reality glasses box is in a worn state; and if the second proximity sensor monitors that the distance from the eyes of the user is greater than the second preset distance, determining that the virtual reality glasses box is in a not-worn state.

Preferably, the "controlling a playing state of the video playing device according to the wearing state of the virtual reality glasses box" in Step S130 comprises: when it is determined that the virtual reality glasses box is in the not-worn state, if the video playing device is playing a video content, pausing the playing of the video content, and shutting down the screen of the video playing device.

More preferably, the "controlling a playing state of the video playing device according to the wearing state of the virtual reality glasses box" in Step S130 further comprises: when it is determined that the virtual reality glasses box is in the worn state, if the playing of a video content in the video playing device was paused because the virtual reality glasses box is in the not-worn state, starting up the screen of the video playing device, and continuing to play the video content from the pausing point.

The video playing device can be mobile terminals such as mobile telephones and tablet computers, and currently the mostly used are smart phones. The current virtual reality glasses boxes merely provides a closed space, and when the mobile telephone is placed inside the virtual reality glasses box, the user can watch the video content on the screen of the mobile telephone through the two pieces of lenses provided on the virtual reality glasses box, in which process there is no communication between the mobile telephone and the virtual reality glasses box. In the method of controlling working state of a virtual reality system provided by the present disclosure, the playing state of the mobile telephone is controlled automatically according to the wearing state of the virtual reality glasses box, and therefore it is needed to firstly establish a connection between the mobile telephone and the virtual reality glasses box, and then transmit the information of wearing state of the virtual reality glasses box through the connection, and the mobile telephone according to the information of wearing state of the virtual reality glasses box controls the playing of the video content. For example, the user after wearing correctly the virtual reality glasses box plays a movie, and when at a time moment the user takes off the virtual reality glasses box, the mobile telephone receives the corresponding state information, and automatically pauses the movie that is being played and shuts down the screen. After the user wears the virtual reality glasses box again, the mobile telephone starts up the screen and continues to play the movie from the pausing point, which enables the user to not miss any extractive contents and can also save the electric power of the mobile telephone. The video content played can be contents such as movies and games.

Figure 2:
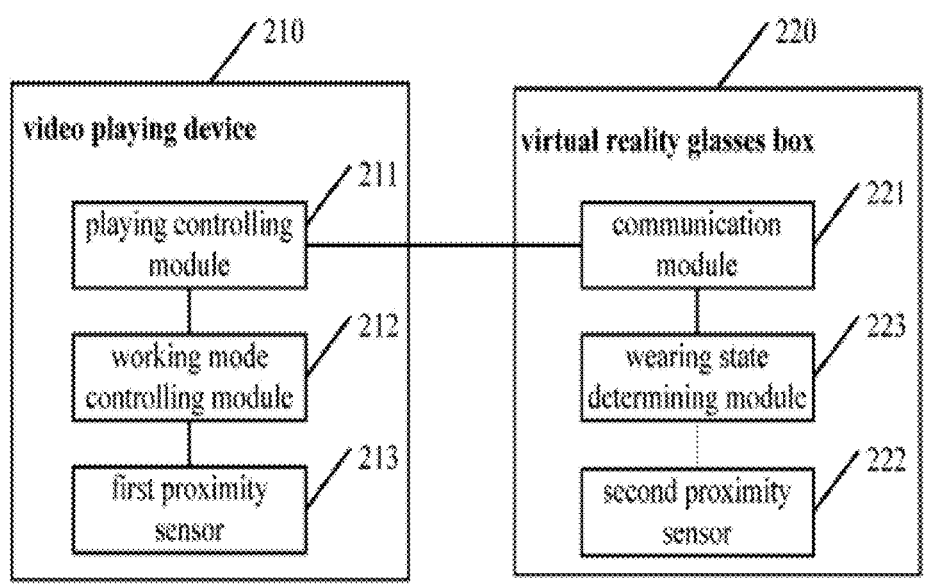
FIG. 2 is the structural schematic representation of a virtual reality system provided by an embodiment of the present disclosure.

FIG. 2 is the structural schematic representation of a virtual reality system provided by an embodiment of the present disclosure. As shown in FIG. 2, the virtual reality system provided by the embodiment of the present disclosure comprises a video playing device 210 and a virtual reality glasses box 220, and the virtual reality glasses box 220 utilizes a screen of the video playing device 210 to play a video content.

The virtual reality glasses box 220 is provided with a communication module 221. The communication module 221 establishes a wired or wireless connection with the video playing device 210, and when the working state of the video playing device 210 is in a virtual reality mode, transmits information of wearing state of the virtual reality glasses box 220 to the video playing device 210.

The video playing device 210 comprises a playing controlling module 211. The playing controlling module 211, according to the wearing state of the virtual reality glasses box 220, controls a playing state of the video playing device 210.

Figure 3:
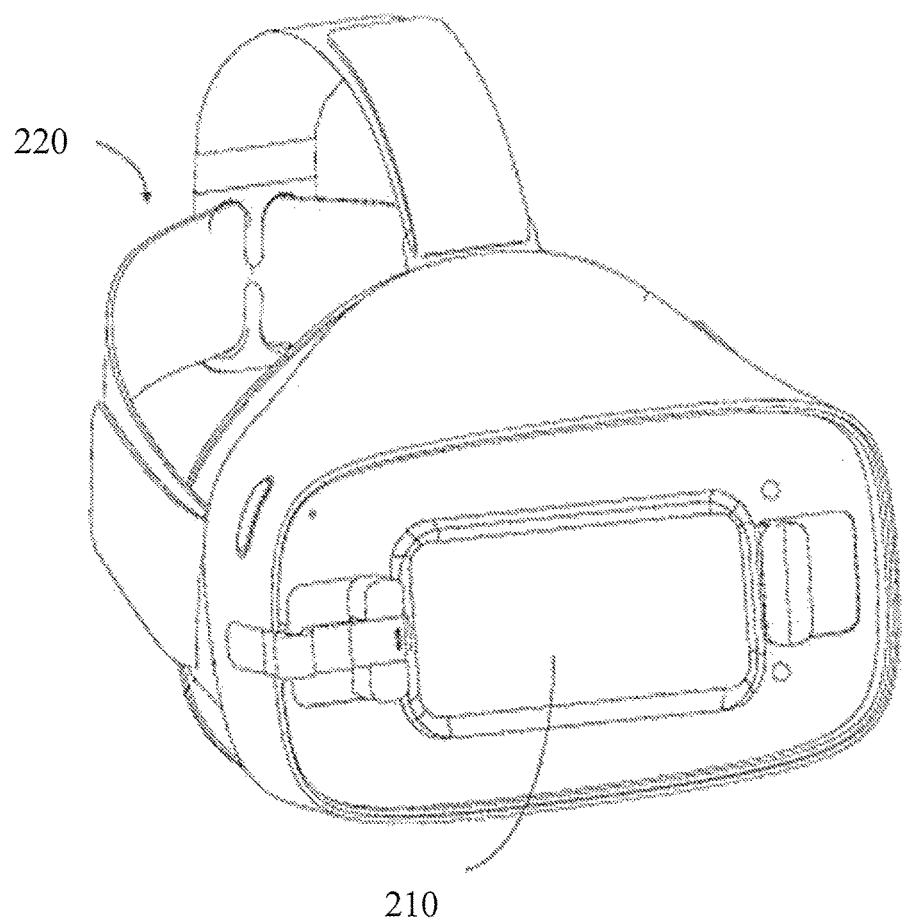
FIG. 3 is a diagram of an example of the placement of a video playing device in a virtual reality glasses box provided by an embodiment of the present disclosure.

In a preferred embodiment, the video playing device 210 is provided with a first proximity sensor 213. The first proximity sensor 213 monitors in real time the distance from the virtual reality glasses box 220, and when the video playing device 210 is placed in the virtual reality glasses box 220 (as shown by the example in FIG. 3), the first proximity sensor 213 can monitor that the distance from the virtual reality glasses box 220 is less than a first preset distance.

The video playing device 210 further comprises a working mode controlling module 212. When the first proximity sensor 213 monitors that the distance from the virtual reality glasses box 220 is less than the first preset distance, the working mode controlling module 212 determines that the video playing device is placed in the virtual reality glasses box, and if at this time the video playing device 210 is in a traditional mode, switches the working mode of the video playing device 210 from the traditional mode to the virtual reality mode, and starts up a picture for adjusting and affirming the position relative to the virtual reality glasses box. When the first proximity sensor 213 monitors that the distance from the virtual reality glasses box 220 is greater than the first preset distance, the working mode controlling module 212 determines that the video playing device is not placed in the virtual reality glasses box, and if at this time the video playing device 210 is in the virtual reality mode, switches the working mode of the video playing device 210 from the virtual reality mode to the traditional mode.

Preferably, the virtual reality glasses box 220 is provided with a second proximity sensor 222. The second proximity sensor 222 monitors in real time the distance from the eyes of the user, and if the user is normally wearing the virtual reality glasses box 220, the second proximity sensor 222 can monitor that the distance from the eyes of the user is less than a second preset distance.

The virtual reality glasses box 220 further comprises a wearing state determining module 223. If the second proximity sensor 222 monitors that the distance from the eyes of the user is less than the second preset distance, the wearing state determining module 223 determines that the virtual reality glasses box 220 is in a normally worn state; and if the second proximity sensor 222 monitors that the distance from the eyes of the user is greater than the second preset distance, determines that the virtual reality glasses box 220 is in a not-worn state.

More preferably, when the virtual reality glasses box 220 is in the not-worn state, if the video playing device 210 is playing a video content, the playing controlling module 211 pauses the playing of the video content, and shut down the screen of the video playing device 210; and when the virtual reality glasses box 220 is in the worn state, if the playing of a video content in the video playing device 210 is paused because the virtual reality glasses box 220 is in the not-worn state, starts up the screen of the video playing device 210, and continues to play the paused video content from the pausing point.

To conclude, the virtual reality system and the method of controlling working state of the virtual reality system provided by the present disclosure, compared with the prior art, has the following advantageous effects:

1. By establishing a wired or wireless connection between the video playing device and the virtual reality glasses box, when the video playing device is placed in the virtual reality glasses box, transmitting information of wearing state of the virtual reality glasses box to the video playing device, and controlling a playing state of the video playing device according to the wearing state of the virtual reality glasses box, the user does not need to employ tedious and complicated operations to control each of the devices, and the action of the user operating the device itself is enough to control the working state of the virtual reality device, which increases the usability.

2. If during the process of the playing of the video content by the video playing device the user takes off the virtual reality glasses box, the video playing device pauses the playing, and shuts down the screen of the video playing device, and after the user wears the virtual reality glasses box again, starts up the screen of the video playing device, and continues to play from the pausing point, which enables the user to not miss any video content, and can also save the electric power of the device for playing the video.

What are described above are only preferred embodiments of the present invention and not intended to limit the protection scope of the present invention. Any modifications, equivalent substitutions and improvements made within the spirit and principle of the present invention are all included in the protection scope of the present invention.

It should be explained that:

The embodiments of the components of the present disclosure can be implemented as hardware, as a software module executed on one or more processors, or as their combination. A person skilled in the art should understand that, microprocessors or digital signal processors (DSP) can be employed in practice to implement some or all of the functions of some or all of the components according to the embodiments of the present disclosure. The present disclosure can also be implemented as devices or device programs for executing some or all of the method described herein (for example, computer programs and computer program products). Such programs for implementing the present disclosure can be stored in computer readable media, or can be in the form of one or more signals. Such signals can be obtained by being downloaded from internet websites, or be provided by carrier signals, or be provided in any other forms.

The virtual reality system of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the virtual reality system executes each of the steps of the method described above.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not chosen to interpret or define the subject matter of the present disclosure.

The invention claimed is:

1. A method of controlling working state of a virtual reality system, wherein the virtual reality system comprises a video playing device and a virtual reality glasses box, and the virtual reality glasses box utilizes a screen of the video playing device to play a video content, the method comprises:

establishing a wired or wireless connection between the video playing device and the virtual reality glasses box;

when the video playing device is placed in the virtual reality glasses box, the video playing device acquiring information if wearing state of the virtual reality glasses box; and the video playing device controlling a playing state of itself according to the wearing state of the virtual reality glasses box, particularly comprising: when the virtual reality glasses box is in a not-worn state, if the video playing device is playing a video content, pausing the playing of the video content, and shutting down the screen; and when the virtual reality glasses box is in the worn state, if the playing of a video content in the video playing device was paused because the virtual reality glasses box is in the not-worn state, starting up the screen, and continuing to play the video content from the pausing point.

2. The method of controlling working state of a virtual reality system according to claim 1, wherein the method further comprises:

providing a first proximity sensor on the video playing device or utilizing a first proximity sensor already provided on the video playing device, to monitor a distance between the video playing device and the virtual reality glasses box;

if the first proximity sensor monitors that the distance between the video playing device and the virtual reality glasses box is less than a first preset distance, determining that the video playing device is placed in the virtual reality glasses box, and if at this time the video playing device is in a traditional mode, switching the video playing device from the traditional mode to a virtual reality mode, and starting up a picture for adjusting and affirming positions of the video playing device and the virtual reality glasses box; and if the first proximity sensor monitors that the distance between the video playing device and the virtual reality glasses box is greater than the first preset distance, determining that the video playing device is not placed in the virtual reality glasses box, and if at this time the video playing device is in the virtual reality mode, switching the video playing device from the virtual reality mode to the traditional mode.

3. The method of controlling working state of a virtual reality system according to claim 2, wherein the method further comprises:

providing a second proximity sensor on the virtual reality glasses box or utilizing a second proximity sensor already provided on the virtual reality glasses box, to monitor a distance between the virtual reality glasses box and eyes of a user; if the second proximity sensor monitors that the distance between the virtual reality glasses box and the eyes of the user is less than a second preset distance, determining that the virtual reality glasses box is in a worn state; and if the second proximity sensor monitors that the distance between the virtual reality glasses box and the eyes of the user is greater than the second preset distance, determining that the virtual reality glasses box is in a not-worn state.

4. A virtual reality system, wherein the virtual reality system comprises a video playing device and a virtual reality glasses box, and the virtual reality glasses box utilizes a screen of the video playing device to play a video content, the virtual reality glasses box is provided with a communication module, and the virtual reality glasses box by using the communication module establishes a wired or wireless connection with the video playing device, and when the video playing device is placed in the virtual reality glasses box, transmit information of wearing state of the virtual reality glasses box to the video playing device; and the video playing device controlling a playing state of itself according to the wearing state of the virtual reality glasses box, particularly comprising: when the virtual reality glasses box is in a not-worn state, if the video playing device is playing a video content, pausing the playing of the video content, and shutting down the screen; and when the virtual reality glasses box is in the worn state, if the playing of a video content in the video playing device was paused because the virtual reality glasses box is in the not-worn state, starting up the screen, and continuing to play the video content from the pausing point.

5. The virtual reality system according to claim 4, wherein, the video playing device is provided with a first proximity sensor, and the video playing device by using the first proximity sensor monitors a distance from the virtual reality glasses box;

and if the first proximity sensor monitors that the distance between the video playing device and the virtual reality glasses box is less than a first preset distance, determines that the video playing device is placed in the virtual reality glasses box, and if at this time the video playing device is in a traditional mode, switches the video playing device from the traditional mode to a virtual reality mode, and starts up a picture for adjusting and affirming positions of the video playing device and the virtual reality glasses box; and if the first proximity sensor monitors that the distance between the video playing device and the virtual reality glasses box is greater than the first preset distance, determines that the video playing device is not placed in the virtual reality glasses box, and if at this time the video playing device is in the virtual reality mode, switches the video playing device from the virtual reality mode to the traditional mode.

6. The virtual reality system according to claim 5, wherein, the virtual reality glasses box is provided with a second proximity sensor, and the virtual reality glasses box by using the second proximity sensor monitors a distance from eyes of a user;

and if the second proximity sensor monitors that the distance between the virtual reality glasses box and the eyes of the user is less than a second preset distance, determines that the virtual reality glasses box is in a worn state; and if the second proximity sensor monitors that the distance between the virtual reality glasses box and the eyes of the user is greater than the second preset distance, determines that the virtual reality glasses box is in a not-worn state.

* * * * *